Figure 1:
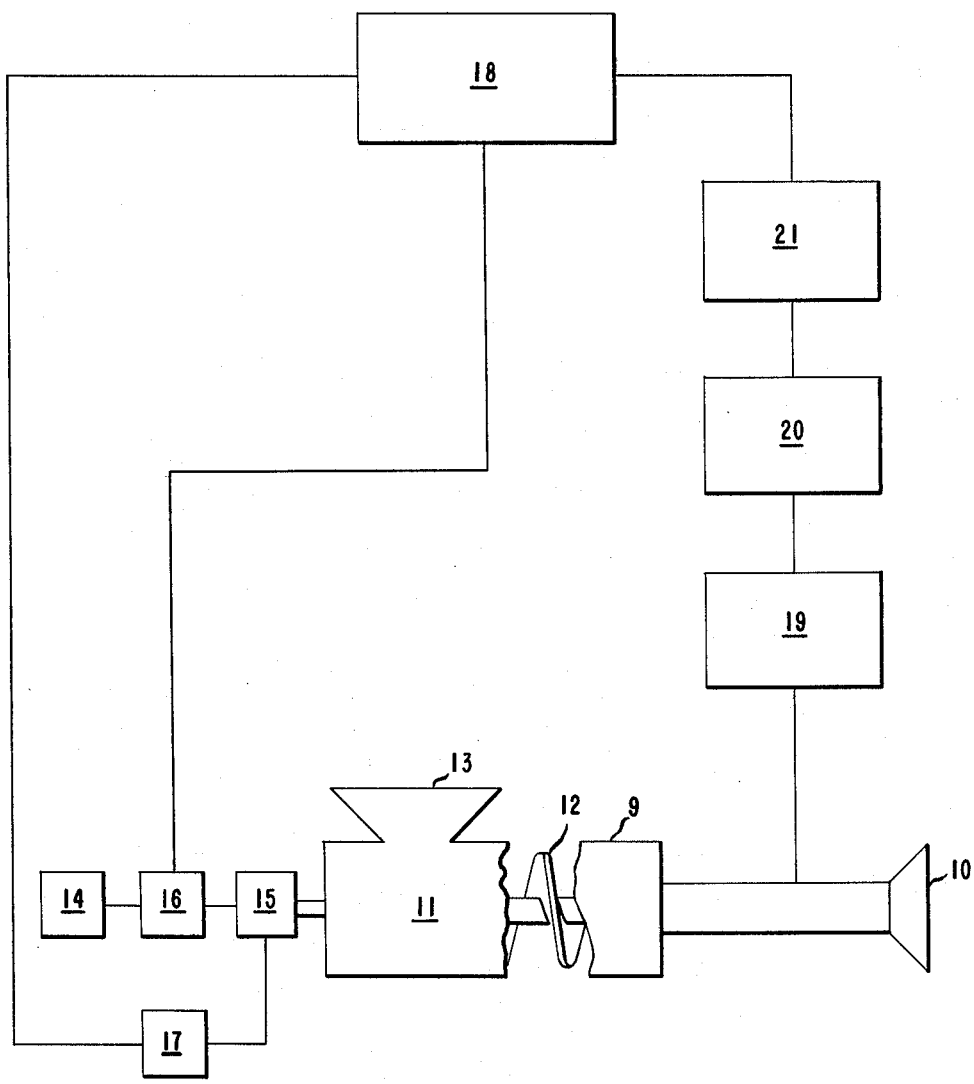

Nov. 26, 1963          P. S. BUCKLEY           3,111,707
            CONTROLLED SCREW FEED DEVICE
Filed Oct. 17, 1962                      2 Sheets-Sheet 1

INVENTOR
PAGE SCOTT BUCKLEY
BY *Herbert M. Wolfson*
ATTORNEY

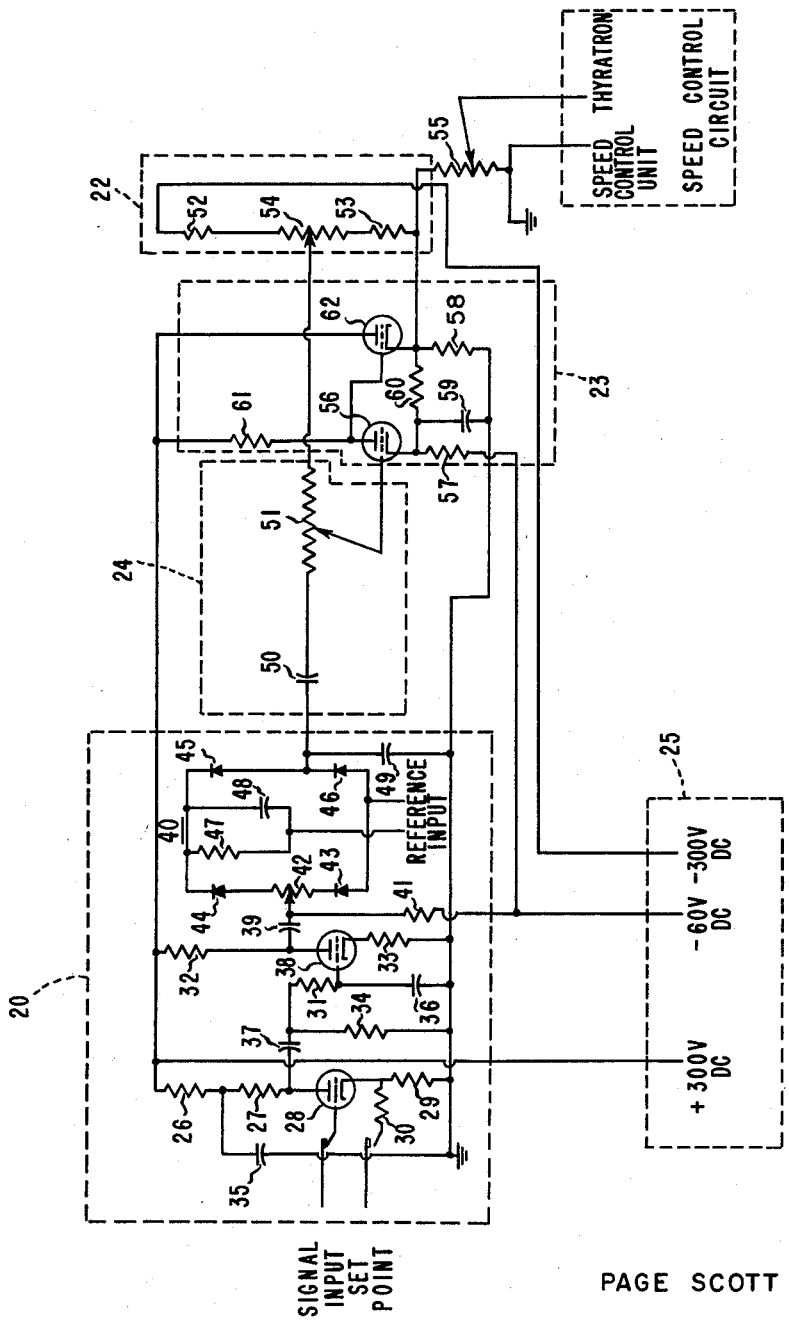

3,111,707
CONTROLLED SCREW FEED DEVICE
Page Scott Buckley, Newark, Del., assignor to E. I. du Pont de Nemours and Company, Wilmington, Del., a corporation of Delaware
Filed Oct. 17, 1962, Ser. No. 231,155
1 Claim. (Cl. 18—2)

This invention relates to a device for providing uniform delivery of thermoplastic materials through a structure shapting die.

For the precise extrusion of thermoplastics, a constant rate of flow through the extrusion die is essential. However, pressure variations originating within the extruder during the extrusion of the thermoplastic cause fluctuations in the extrudate rate. These fluctuations can be disastrous to the operability of the process and expensive when waste and off-specification material result.

Since the average flow rate through the die is determined by the rotational speed of the screw in a conventional screw extruder, it had been felt that by manipulating the screw speed one could avoid fluctuations in the flow rate. Specifically, by measuring the pressure immediately upstream of the extrusion die and using this measurement to adjust the screw speed automatically, it had been felt that the pressure could be held constant and, thus, fluctuations in flow rate could be virtually eliminated. However, slight changes in the viscosity or melt index of the thermoplastic material or changes in the temperature of material, all tend to alter this picture. Since the variable being controlled, the pressure, has only an indirect effect on the variable over which control is desired, the flow rate, it has been found in many cases that keeping the pressure constant resulted in an undesirable varying throughput rate instead of a constant throughput rate.

The main object of the present invention is to provide a device that will produce a substantially constant throughput rate irrespective of changes in temperature, viscosity, etc., of the extrudate and irrespective of whether the changes are of a temporary or permanent nature. Other objects will appear hereinafter.

The purpose is accomplished by a novel system for controlling the rate of rotation of an extruder screw. Specifically, the novel system employs a controller that utilizes the rate of change of pressure of thermoplastic material in the area immediately prior to extrusion to modify or supplement the normal operation of a speed control system that controls extruder speed by maintaining a constant rate of rotation for the extruder screw. In this way, variables such as melt index, viscosity, i.e. variables that are connected with the material going through the extruder but which may be only of a very short duration, are permitted to have an effect on extruder speed only if they recur.

FIGURE 1 is a block diagram of the apparatus of this invention; and FIGURE 2 is a circuit diagram for the critical parts of the apparatus.

The extruding device is generally indicated at 11 in FIGURE 1. The screw feed device is composed of a barrel 9 in which the screw 12 is adapted to rotate. The barrel 9 is provided with an inlet opening 13. The thermoplastic material is fed into the barrel 9 in solid granulated form. The barrel may be surrounded by heating or cooling means to alter the consistency of the material as the material is being worked and advanced by the screw.

The screw 12 is adapted to be driven by a motor 14, usually an A.C. induction torque motor. The shaft of the motor 14 is connected with the shaft of screw 12 by means of suitable gearing 15. Between the motor 14 and the gear train 15 is a magnetic clutch coupling 16, such as a so-called "Dynamatic" coupling (manufactured by the Eaton Manufacturing Company), which is used as the mechanism to control the speed of the screw 12.

The speed of rotation of the clutch coupling 16 is related to and controlled by the field current in the clutch coupling circuit. This field current is produced from two sources. In one source, a tachometer generator 17 generates an A.C. voltage that is proportional to the screw speed at any particular moment. This voltage provides a current through the control unit 18. The control unit 18 may take the form of a thyratron tube, the current from the tachometer generator 17 being supplied to the grid-cathode circuit of the thyratron. By pre-setting the bias of the thyratron, the emerging current will be altered from the input tachometer generator current in such a manner as to supply a current to the clutch coupling 16 that will provide the particular speed desired for the screw extruder 12.

The second source of current to the field of the clutch coupling is obtained from the pressure of the molten material between the extruder 11 and the die 10. The pressure of the molten material is sensed and fed through an electrical transducer 19 to provide a current that is directly proportional to the sensed pressure. The pressure may be sensed and changed to current by a "Dynisco" pressure gauge (strain gauge type, balanced bridge[1]). An error is detected and amplified in the combination error detector and amplifier 20. The amplified error signal is fed to the non-set point controller 21. The controller provides an error correction that is proportional to the rate of change of the input signal. The output of the non-set point controller 21 is transmitted to the control unit 18. If a thyratron tube were used, then the signal from the non-set point controller 21 and the signal from the tachometer generator 17 are both fed to the thyratron grid circuit. The combined signals in the grid circuit in combination with the pre-set bias of the thyratron provide the current in the field of the clutch coupling 16 to control its effect on the speed of the screw extruder 12.

One possible circuit for the critical non-set point controller 21 is shown in combination with the error detector and amplifier 20 in FIGURE 2. The controller 21, as shown in FIGURE 2, is composed of a lead-in unit 24, the output amplifier 23 and the reset network 22.

A signal representing the sensed pressure is fed from transducer 19 to the grid of the vacuum tube 28. After being refined and amplified in the circuitry represented by resistors 26, 27, 29, 30, 31, 32, 33, and 34 and condensers 35, 36, and 37 and the vacuum tube 38, the signal is fed through condenser 39 to be compared to the reference signal in the bridge circuitry shown generally in 40. Power is supplied to the bridge through resistor 41 from the power supply 25 and is controlled by the potentiometer 42. The bridge is composed of 4 rectifiers 43, 44, 45, and 46, a resistor 47 and a condenser 48.

The error signal is then fed into the lead-in units 24, the feed wire being ground through condenser 49 to prevent any inaccuracies. The lead-in unit 24 is composed of a blocking capacitor 50 and a variable 62.7 megohm resistor 51. The capacitor 50 serves to provide a low frequency response to a proportional, manual reset controller, resetting being performed in the reset network 22 composed of resistors 52 and 53 and variable resistor 54. the capacitance for the blocking capacitor 50 is determined from the following expression:

$$C \text{ (farads)} = \frac{t \text{ (seconds)}}{\frac{K_p}{K_p + 31}} \times 62.7 \times 10^6 \text{ (ohms)}$$

wherein "$t$" is the time constant of the non-set point feature and "$K_p$" is the proportional band setting.

---
[1] Manufactured by Dynamic Instrument Division of the American Brake Shoe Company.

The time constant, "t," used for the calculation may be determined by observing the pressure-pulse pattern in the melt stream of the extruder and selecting as an empirical time constant a value lying between the longest and shortest time over which the pressure disturbance occurs. In a typical operation, with a value for time constant of ⅓ minute, which is representative of the pressure surge characteristics of the extruder, and at a proportional band setting of 5.8%, a condenser value of two microfarads was obtained.

The proportional band setting of 5.8% was arrived at by starting the unit at a high setting, about 200%. As the extruder increased speed and reached steady operating conditions, the band setting was moved to lower values until the system became hyper-sensitive. For the combination indicated above, a setting of 5.8% appeared most suitable. It was slightly higher than the hyper-sensitive value.

The signal from the lead-in unit 24 is amplified in the amplifier section 23. The amplifier section 23 receives the signal from the lead-in unit 24 on the grid of vacuum tube 56. Power is supplied to this section from power supply 25 through resistors 57 and 61. The remaining circuitry in this section is represented by condenser 59, resistors 60 and 58 and vacuum tube 62.

The resulting signal is fed through variable resistor 55 to the grid circuit to the thyratron 18. The corrective signal provided to the grid circuit of the thryatron is substantially proportional to the rate of change of pressure.

Having fully disclosed the invention, what is claimed is:

In a screw feed device for continuously advancing a softened plastic material having a variable control mechanism for regulating the speed of the screw, a hollow forming device through which said plastic material is forced by the feed device and a passage for delivering said plastic material from said screw feed device to said forming device, the improvement comprising means communicating with said variable control mechanism, said means pre-set to maintain the speed of the screw at any desired level; means responsive to the rotational speed of the screw communicating with said pre-set means to control said variable control mechanism to maintain the speed of the screw at said desired level; a pressure-responsive element in said passage communicating with said pre-set means; a control mechanism disposed between said pressure-responsive element and said pre-set means adapted to transmit a corrective signal to said variable control mechanism through said pre-set means to correct the speed of the screw in accordance with pressure changes in said passage, said corrective signal being subject to rapid decay in said control mechanism whereby any correction of the screw speed due to a change in the pressure in said passage will occur only if the change in pressure recurs.

References Cited in the file of this patent

UNITED STATES PATENTS

| | | |
|---|---|---|
| 2,747,222 | Koch et al. | May 29, 1956 |
| 2,747,224 | Koch et al. | May 29, 1956 |
| 2,802,237 | Davis | Aug. 13, 1957 |